US008806768B1

(12) United States Patent
Murphy

(10) Patent No.: US 8,806,768 B1
(45) Date of Patent: Aug. 19, 2014

(54) FORCE ASSIST COMPASS

(76) Inventor: Michael E. Murphy, Lower Sackville (CA)

( * ) Notice: Subject to any disclaimer, the term of this patent is extended or adjusted under 35 U.S.C. 154(b) by 176 days.

(21) Appl. No.: 13/616,543

(22) Filed: Sep. 14, 2012

(51) Int. Cl.
*B43L 13/00* (2006.01)

(52) U.S. Cl.
USPC ............................... 33/354; 33/431

(58) Field of Classification Search
USPC .................. 33/1 R, 1 SB, 354, 355, 356, 431
See application file for complete search history.

(56) References Cited

U.S. PATENT DOCUMENTS

| | | | |
|---|---|---|---|
| 1,794,964 A | 3/1931 | Knutson | |
| 2,013,603 A | 9/1935 | Dalton | |
| 3,280,464 A * | 10/1966 | Warner | 33/431 |
| 3,721,007 A * | 3/1973 | Banner | 33/356 |
| 3,863,347 A * | 2/1975 | Banner | 33/457 |
| 4,170,065 A | 10/1979 | Hiscott | |
| 4,359,628 A * | 11/1982 | Lambert | 33/431 |
| 4,383,372 A * | 5/1983 | Zane et al. | 33/1 SD |
| 4,969,271 A * | 11/1990 | Sump | 33/431 |
| 5,127,358 A | 7/1992 | Galloway et al. | |
| 5,167,076 A * | 12/1992 | Sump | 33/431 |
| 5,404,648 A * | 4/1995 | Taylor, Jr. | 33/431 |
| 5,819,426 A * | 10/1998 | Virtanen | 33/431 |
| 6,134,796 A * | 10/2000 | Johnson | 33/1 SD |
| 2007/0113415 A1* | 5/2007 | Shih | 33/471 |
| 2012/0110865 A1* | 5/2012 | Vaught | 33/431 |

* cited by examiner

*Primary Examiner* — G. Bradley Bennett
(74) *Attorney, Agent, or Firm* — Robert C. Montgomery; Montgomery Patent & Design

(57) ABSTRACT

A marine navigation compass-protractor having a transparent base and a three-hundred sixty degree (360°) directional scale on a top surface is disclosed. The transparent base allows it to be placed on a map while still viewing map details. The center of the compass protractor has a plurality of rotating arms that numerically depict the direction and engine thrust characteristics of marine vessels jointly performing navigational tasks. Another arm provides a bearing/heading indication. The marine navigation compass-protractor enables an operator of a marine vessel better perform navigational decisions.

7 Claims, 4 Drawing Sheets

FORCE ASSIST COMPASS

RELATED APPLICATIONS

Not Applicable.

FIELD OF THE INVENTION

The presently disclosed subject matter is directed toward marine navigation aids. More particularly, the present invention relates to a marine navigation compass-protractor having a transparent base, a three-hundred sixty degree (360°) directional scale, a plurality of rotating arms depicting direction and engine thrust characteristics.

BACKGROUND OF THE INVENTION

No matter what task is being performed nothing beats having the proper tools. Proper tools can save time and money, produce a higher quality result, reduce damage to equipment, and provide for increased worker safety. Almost every field of work has its own specialty tools for performing specialized tasks. One (1) specialized task which few people perform is moving barges along rivers, canals, and other bodies of water. Since few barges have their own power source they are usually moved by tug boats or other assist vessels.

While smaller barges may use only one (1) assist vessel, larger and/or heavier barges may use several assist vessels. This dramatically increases the complexity of moving and handling the barges. Complicating the handling of barges using multiple assist vessels is that some vessels may push while others may pull the barge. Each assist vessel applies it force at a different point on the barge, with a different force vector, and at differing power levels. It becomes extremely difficult to centrally control multiple assist vessels to achieve delicate barge maneuvers such as docking. Coordinating the direction and power of multiple vessels particularly in close quarter navigation maneuvers is difficult. A simple error can result in an accident that damage equipments, pollute waters, or even cost lives or human suffering. Accordingly, there exists a need for a device by which barge navigation using multiple assist vessels can be accomplished simply and reliably to avoid the disadvantages described above. Such a device that is suitable for both indoor and outdoor use, in different lighting settings, and with different assist vessels would be very useful.

SUMMARY OF THE INVENTION

The principles of the present invention provide for a force assist compass-protractor that is useful in barge navigation. The invention comprises a clear plastic circular base, beneficially about eight to ten inches (8-10 in.) in diameter. The base outer perimeter has three hundred sixty degree (360°) markings at one degree (1°) increments. The clear base allows it to be set on a map while still showing map details. The force assist compass-protractor is set northward while the center is provided with a movable assembly that depicts a barge. Two (2) indicia arms protrude as travel vectors. Those indicia arms are set to the travel path or "push/pull direction" of assist vessels on the barge. The two (2) indicia arms can also display the power level or force applied by the assist vessels. Given those inputs the force assist compass-protractor enables a quick determination of the resulting travel direction of the barge while allowing the user to take the guesswork out of split-second decisions. A force assist compass-protractor may further include internal illumination or provide for permanent installation and indoor/outdoor use.

A compass-protractor in accord with the present invention includes a transparent base having a center axis point, a centrally located fastener passing through the center axis point, a rotatable first thrust pointer comprised of a first pointer body having a first mounting aperture and first numeric thrust indicia, a first slide mechanism for selectively revealing the first numeric indicia and a first pointed tip, and a rotatable second thrust pointer comprised of a second pointer body having a second mounting aperture and second numeric thrust indicia, the second thrust pointer further including a second slide mechanism for selectively revealing the second numeric indicia and a second pointed tip.

The compass-protractor further includes a first spacer between the first thrust pointer and the second thrust pointer, a rotatable bearing pointer attached to the fastener, a second spacer between the second thrust pointer and the bearing pointer, and angle indicia for three-hundred-sixty degrees (360°) over the base. At least the first thrust pointer and the second thrust pointer are frictionally held in position. The first numeric thrust indicia indicates engine thrust for a first vessel while the second numeric thrust indicia indicates engine thrust from a second vessel.

In practice the compass-protractor is about eight to ten inches wide and may include a third thrust pointer comprised of a third pointer body having a third mounting aperture and third numeric thrust indicia, and a third slide mechanism for selectively revealing the third numeric indicia and a third pointed tip. Beneficially the first thrust point, the second thrust point, and the third thrust pointer are color-coded with different colors to designate different vessels. A top-mounted washer and a nut fastener can be used to adjust friction that retains the first thrust pointer and the second thrust pointer in position. At least the first slide mechanism may have a window to enable an operator to selectively align the window with thrust indicia.

Another compass-protractor that is in accord with the present invention includes a transparent base having an axis point and a threaded fastener that passes through the axis point. A first thrust pointer is rotatably attached to the fastener. The first thrust pointer includes a first pointer body having a first mounting aperture and a set of first numeric thrust indicia. The first thrust pointer further includes a first slide mechanism having a first window for selectively revealing the first numeric indicia. The first pointer body has a first pointed tip. The compass-protractor further includes a second thrust pointer that is rotatably attached to the fastener. The second thrust point includes a second pointer body having a second mounting aperture and a set of second numeric thrust indicia. The second thrust pointer further includes a second slide mechanism having a second window for selectively revealing the second numeric indicia and a second pointed tip.

The compass-protractor further includes a third thrust pointer that is rotatably attached to the fastener. The third thrust point includes a third pointer body having a third mounting aperture and a set of third numeric thrust indicia. The third thrust pointer further includes a third slide mechanism having a third window for selectively revealing the third numeric indicia and a third pointed tip. The compass-protractor also includes a first spacer disposed between the first thrust pointer and the second thrust pointer, a second spacer disposed between the second thrust pointer and the third thrust pointer, a pointed bearing pointer that is rotatably attached to the fastener, a washer and a nut fastener on an end of the threaded fastener for producing friction forces on the first thrust pointer, the second thrust pointer, the third thrust pointer, and the bearing pointer to frictionally retain them in position; and angle indicia disposed on the base. The first numeric thrust indicia indicate engine thrust from a first vessel, the second numeric thrust indicia indicate engine thrust from a second vessel, and the third numeric indicia indicate thrust from a third vessel. The first thrust pointer, the second thrust pointer, and the third thrust pointer are color coded to respectively designate the first, second, and third vessels.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 3b is a side exploded view of the thrust pointer 40, 42, 44 shown in FIG. 3a;

FIG. 4a is a top view of a bearing pointer portion 46 used in the force assist compass-protractor 10 shown in FIGS. 1 and 2; and, FIG. 4b is a side view of the bearing pointer portion 46 shown in FIG. 4a.

DESCRIPTIVE KEY

| | |
|---|---|
| 10 | force assist compass-protractor |
| 20 | base |
| 30 | compass protractor |
| 32 | angle indicia |
| 40 | first thrust pointer |
| 42 | second thrust pointer |
| 44 | third thrust pointer |
| 46 | bearing pointer |
| 48 | thrust pointer body |
| 50 | numeric thrust indicia |
| 52 | pointed tip |
| 54 | mounting aperture |
| 56 | slide mechanism |
| 58 | window |
| 60 | bearing pointer body |
| 62 | bearing indicia |
| 80 | threaded fastener |
| 82 | washer |
| 84 | nut fastener |
| 86 | spacer |

DETAILED DESCRIPTION OF THE PREFERRED EMBODIMENT

The best mode for carrying out the invention is presented in terms of its preferred embodiment, herein depicted within FIGS. 1 through 4b. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 1:
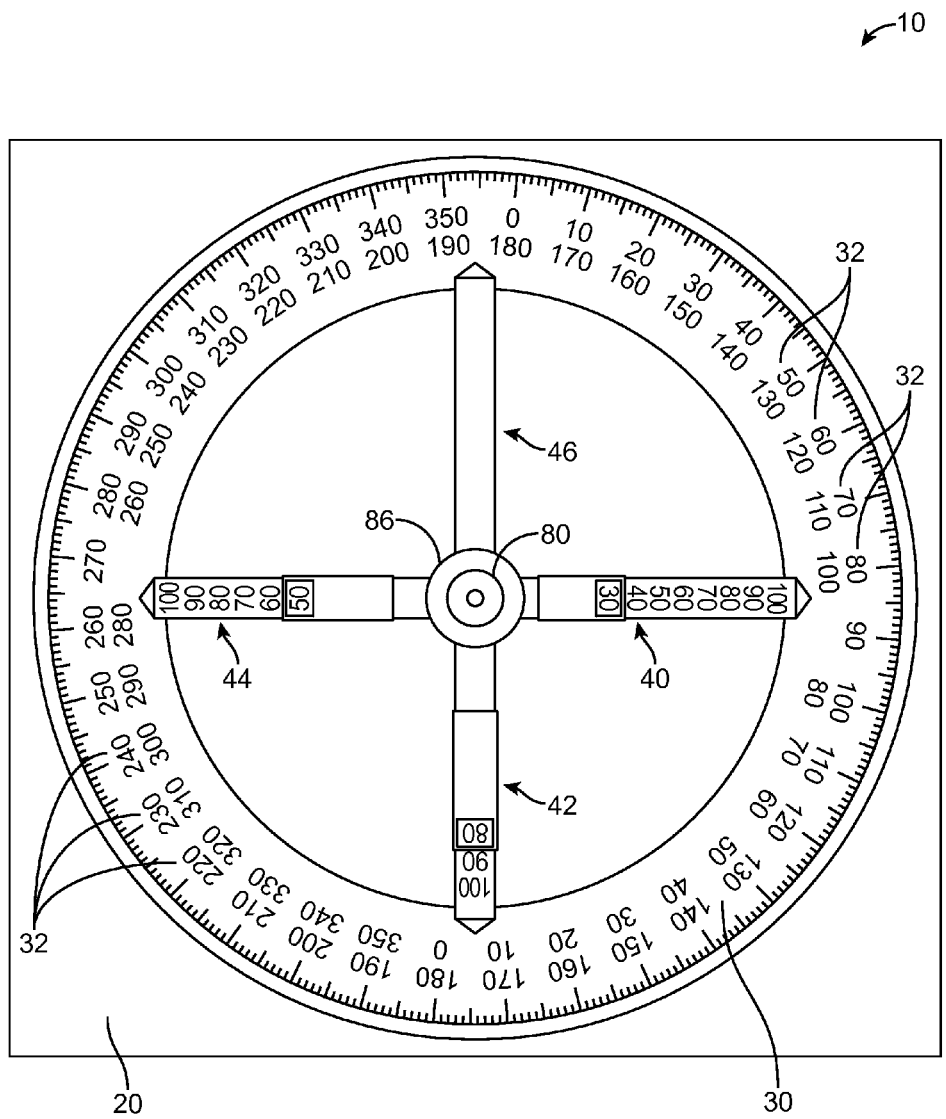
FIG. 1 is a top view of a force assist compass-protractor 10 according to a preferred embodiment of the present invention.

Referring now to FIG. 1, the present invention is a force assist compass-protractor 10 that is suitable for use with maneuvering barges, other water craft, or other pushed and/or pulled structures using auxiliary force applying systems. The force assist compass-protractor 10 can assist making use of vessels to perform various navigational tasks such as, but not limited to: navigating barges, controlling vessel traffic, ocean towing, and the like.

As shown in FIG. 1, the force assist compass-protractor 10 includes a rectangular transparent plastic or glass base 20 that is approximately eight to ten inches (8-10 in.) on a side. The force assist compass-protractor 10 also includes an integral circumscribed compass protractor 30 having angle indicia 32 for three-hundred-sixty degrees (360°), preferably using markings at one degree (1°) graduations. The base 20 allows the force assist compass-protractor 10 to be positioned on a map while still allowing observation of the map details.

The base 20 also comprises a rotatable assembly that mounted at a center axis point. The rotatable assembly includes a first thrust pointer 40, a second thrust pointer 42, a third thrust pointer 44, and a bearing pointer 46. The thrust pointers 40, 42, 44 provide a means to depict force direction and percent thrust of both a primary marine vessel and companion auxiliary vessels, reference FIGS. 3a, 3b, 3c, 4a, 4b.

Figure 2:
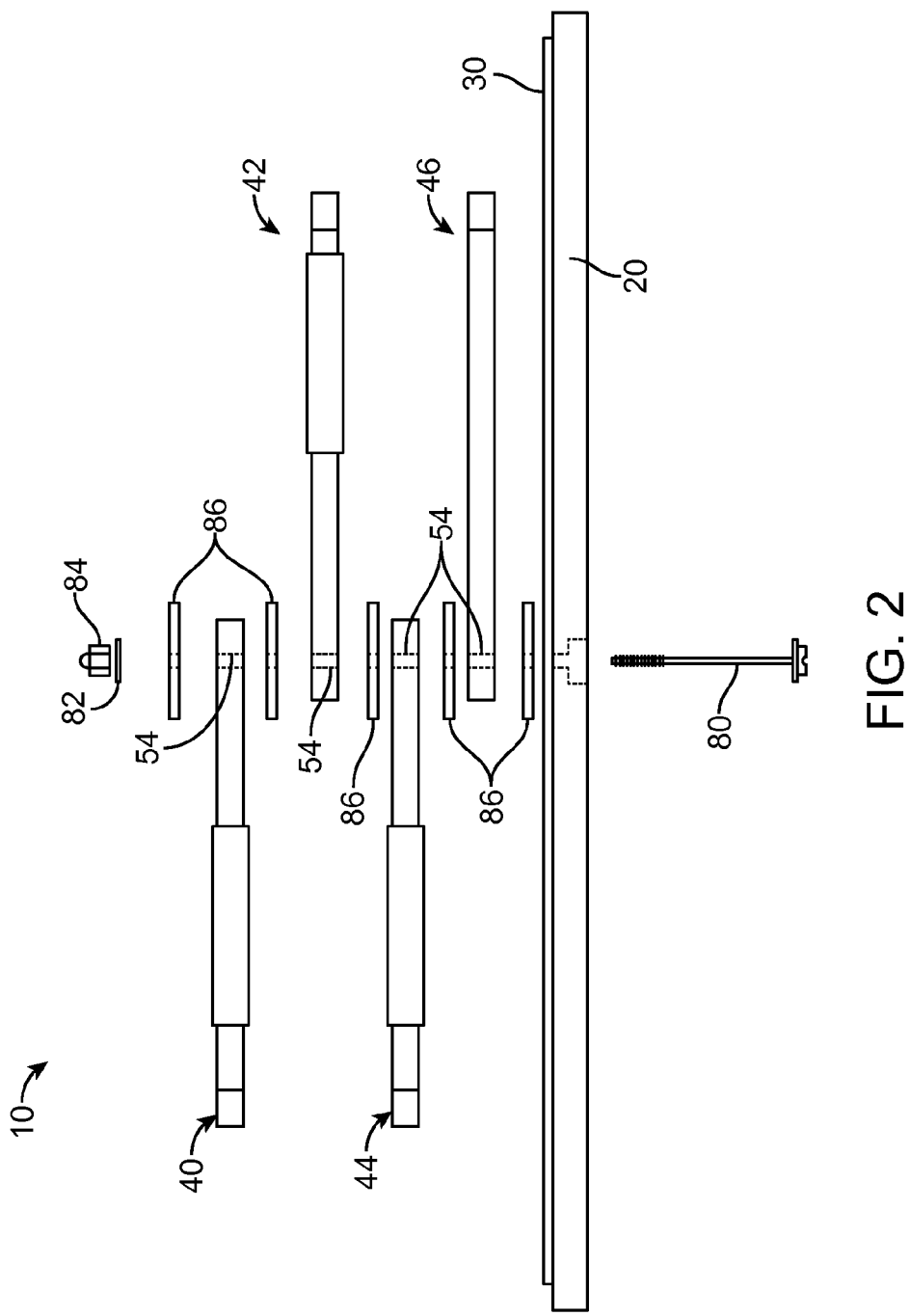
FIG. 2 is an exploded view of the force assist compass-protractor 10 shown in FIG. 1.

FIG. 2 presents an exploded side view of the force assist compass-protractor 10. The base 20 and the pointers 40, 42, 44, 46 are arranged in a stacked assembly upon a vertical centrally located threaded fastener 80. The base 20 is envisioned to be positioned upon a stationary surface while a mounting aperture portion 54 of each thrust pointer 40, 42, 44 is inserted upon the threaded fastener 80. Also included in the stacked assembly is a plurality of separating spacers 86. The thrust pointers 40, 42, 44 and spacers 86 are sequentially inserted upon the threaded fastener 80 and then held in place using a top mounted washer 82 and a nut fastener 84. The stacked assembly are arranged and secured so as to allow an operator to smoothly rotate and adjustment each pointer 40, 42, 44, and 46. Proper tightening of the threaded fastener 80, washer 82, and the nut fastener 84 produce a slight frictional resistance to rotation of the pointers 40, 42, 44, and 46.

Figure 3A:
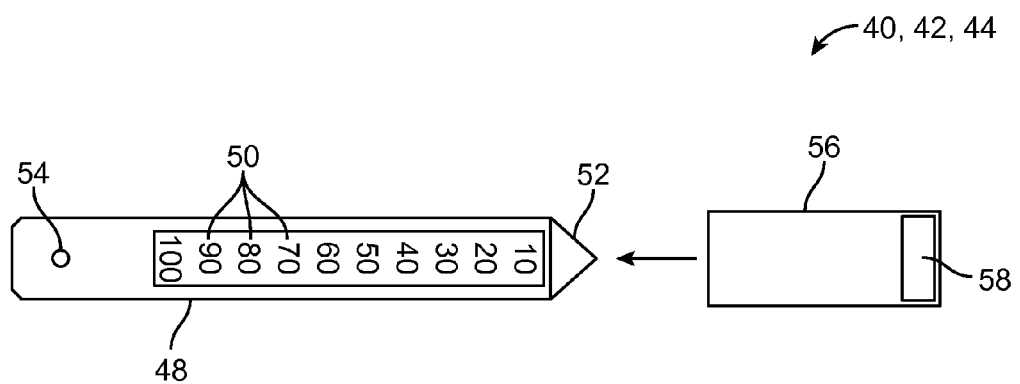
FIG. 3a is a top exploded view of a thrust pointer 40, 42, 44 used in the force assist compass-protractor 10 shown in FIGS. 1 and 2.
Figure 3B:
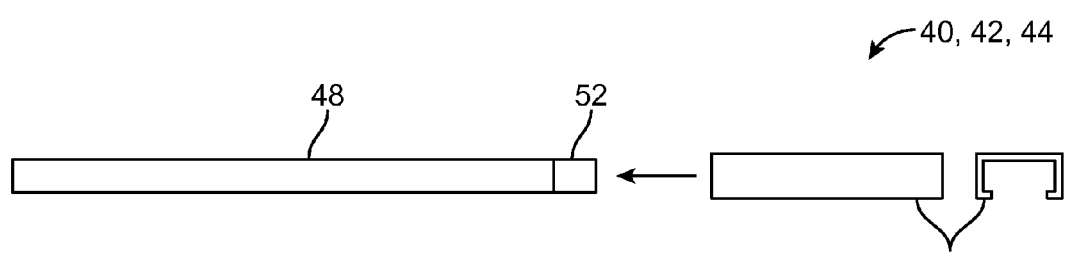
Figure 3C:
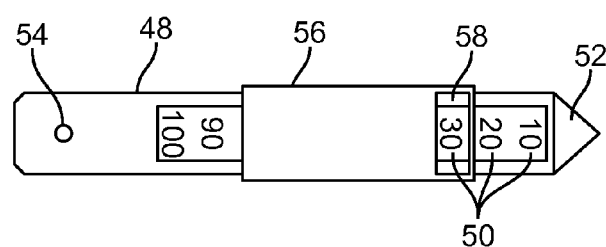
FIG. 3c is a top assembly view of the thrust pointer portion 40, 42, 44 shown in FIGS. 3a and 3b.

Refer now to FIGS. 3a, 3b, 3c for various views of thrust pointers 40, 42, 44. The thrust pointers 40, 42, 44 are geometrically identical. Each includes a thrust pointer body 48, numeric thrust indicia 50, a pointed tip 52, a mounting aperture 54, and a slide mechanism 56. Each thrust pointer 40, 42, 44 is uniquely color-coded so that they can represent individual marine vessels that are jointly performing a navigational task. Each thrust pointer body 48 includes a linear pointing device having a rectangular cross section and a triangular pointed tip 52. In use the pointed tip 52 is directed toward a bearing reading on the compass protractor 30.

Additionally each thrust pointer body 48 has a numeric thrust indicia 50 printed or molded upon a top surface. The numeric thrust is adjusted to indicate a percentage of available engine thrust ranging from zero to one-hundred percent (0-100%). Each thrust pointer body 48 is sized to slide along a respective slide mechanism 56. Each slide mechanism 56 has a small upward-facing rectangular window 58 that allows an operator to selectively align the window 58 with a particular thrust indicia number 50. In this manner an operator is able to retain both direction and thrust information for one (1) or more marine vessels quickly and in an easily readable manner. This allow for the quick determination of the travel direction of a primary marine vessel in which the force assist compass-protractor 10 is located as well as that of any companion vessels.

Figure 4A:
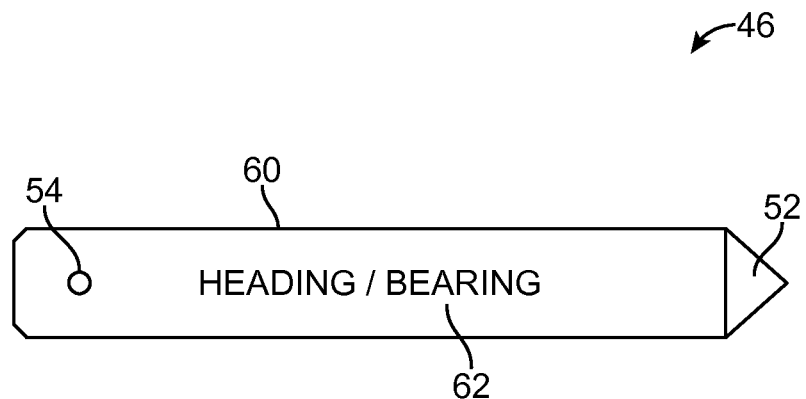
Figure 4B:

Referring now to FIGS. 4a and 4b, top and side views of a bearing pointer 46 of the force assist compass-protractor 10. The bearing pointer portion 46 provides similar mounting, rotating, and pointing functions as the previously described thrust pointers 40, 42, 44; however, the bearing pointer 46 lacks a slide mechanism 56 and is envisioned as being used to point along the compass protractor 30 in the actual heading of the vessel in which the force assist compass-protractor 10 is located. The bearing pointer 46 comprises a pointed tip 52, a mounting aperture 54, and a bearing pointer body 60 similar to the thrust pointer body 48 but further comprises identifying bearing indicia 62 along a top surface.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the force assist compass-protractor 10, it would be assembled and configured as indicated in FIG. 1.

The method of utilizing the force assist compass-protractor 10 may be achieved by performing the following steps: procuring the force assist compass-protractor 10; placing the base 20 of the force assist compass-protractor 10 upon a map, table, or other suitable surface; rotating and adjusting the bearing pointer 46 toward the angle indicia 32 of the compass protractor 30 to indicate an actual heading of a primary marine vessel; rotating and adjusting one (1) or more thrust pointers 40, 42, 44 to indicate the directions of a assisting vessels; adjusting the slide 56 on one (1) or more thrust pointers 40, 42, 44 to show the thrust characteristics of the primary marine vessel and assisting vessels, as required; continuing to monitor and adjust the features of the thrust pointers 40, 42, 44 and the bearing pointer 46 as conditions change during maneuvering; and, benefiting from easy reading of the current direction and thrust information for one (1) or more marine vessels afforded a user of the present invention 10.

The force assist compass-protractor 10 allows an operator of a marine vessel to take the guesswork out of split-second navigating decisions. The use of the force assist compass-protractor 10 allows for easy coordination of navigation tasks and similar activities amongst multiple vessels in a manner which reduces stress and the likelihood of making potentially hazardous or costly mistakes.

The majority of the components as used in the present invention would be made of plastic in an injection molding process. Such a process would require the design and use of custom molds. Other variations can be made of brass, stainless, steel, aluminum, and other materials. The various pieces may be joined together using a brass rivet or perhaps a threaded connector with a thumbscrew for controlling tension and allowing locking of the components together The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A compass-protractor, comprising:
 a transparent base having a center axis point;
 a centrally located fastener passing through said center axis point;
 a first thrust pointer comprised of a first pointer body having a first mounting aperture and first numeric thrust indicia, said first thrust pointer further including a first slide mechanism for selectively revealing said first numeric indicia and a first pointed tip, said first thrust pointer rotatably attached to said fastener;
 a second thrust pointer comprised of a second pointer body having a second mounting aperture and second numeric thrust indicia, said second thrust pointer further including a second slide mechanism for selectively revealing said second numeric indicia and a second pointed tip, said second thrust pointer rotatably attached to said fastener;
 a first spacer disposed between said first thrust pointer and said second thrust pointer;
 a bearing pointer attached to said fastener so as to be rotatable;
 a second spacer disposed between said second thrust pointer and said bearing pointer; and,
 angle indicia for three-hundred-sixty degrees disposed over said base;
 wherein said first thrust pointer and said second thrust pointer are frictionally held in position; and,
 wherein said first numeric thrust indicia indicates engine thrust for a first vessel and said second numeric thrust indicia indicates engine thrust from a second vessel.

2. The compass-protractor according to claim 1, wherein base is between approximately eight to ten inches wide.

3. The compass-protractor according to claim 1, further including a third thrust pointer comprised of a third pointer body having a third mounting aperture and third numeric thrust indicia, said third thrust pointer further including a third slide mechanism for selectively revealing said third numeric indicia and a third pointed tip, said third thrust pointer rotatably attached to said fastener, and wherein said third numeric thrust indicia indicates engine thrust of a third vessel.

4. The compass-protractor according to claim 3 wherein said first thrust point, said second thrust point, and said third thrust pointer are color-coded with different colors to designate different vessels.

5. The compass-protractor according to claim 4 further including a top mounted washer and a nut fastener for adjusting friction retaining said first thrust pointer and said second thrust pointer in position.

6. The compass-protractor according to claim 4 wherein said first slide mechanism includes a window for enabling an operator to selectively align the window with thrust indicia of said first numeric thrust indicia.

7. A compass-protractor, comprising:
 a transparent base having an axis point;
 a threaded fastener passing through said axis point;
 a first thrust pointer comprised of a first pointer body having a first mounting aperture and a set of first numeric thrust indicia, said first thrust pointer further including a first slide mechanism having a first window for selectively revealing said first numeric indicia, said first pointer body having a first pointed tip, said first thrust pointer rotatably attached to said fastener;

a second thrust pointer comprised of a second pointer body having a second mounting aperture and a set of second numeric thrust indicia, said second thrust pointer further including a second slide mechanism having a second window for selectively revealing said second numeric indicia, said second pointer body having a second pointed tip, said second thrust pointer rotatably attached to said fastener;

a third thrust pointer comprised of a third pointer body having a third mounting aperture and a set of third numeric thrust indicia, said third thrust pointer further including a third slide mechanism having a third window for selectively revealing said third numeric indicia, said third pointer body having a third pointed tip, said third thrust pointer rotatably attached to said fastener;

a first spacer disposed between said first thrust pointer and said second thrust pointer;

a second spacer disposed between said second thrust pointer and said third thrust pointer;

a pointed bearing pointer attached to said fastener so as to be rotatable;

a washer and a nut fastener on an end of said threaded fastener for producing friction forces on said first thrust pointer, said second thrust pointer, said third thrust pointer, and said bearing pointer to frictionally retain them in position; and, angle indicia disposed on said base;

wherein said first numeric thrust indicia indicate engine thrust for a first vessel, said second numeric thrust indicia indicate engine thrust from a second vessel, said third numeric indicia indicate thrust from a third vessel; and, wherein said first thrust pointer, said second thrust pointer, and said third thrust pointer are color coded to respectively designate said first, second, and third vessels.

* * * * *